C. H. RIPPL.
ALTERNATING CURRENT MAGNET.
APPLICATION FILED JUNE 7, 1919.

1,370,914.

Patented Mar. 8, 1921.
3 SHEETS—SHEET 1.

WITNESS
R. F. Dilworth

INVENTOR.
Charles H. Rippl
by F. N. Barber
Attorney

C. H. RIPPL.
ALTERNATING CURRENT MAGNET.
APPLICATION FILED JUNE 7, 1919.
1,370,914.
Patented Mar. 8, 1921.
3 SHEETS—SHEET 2.
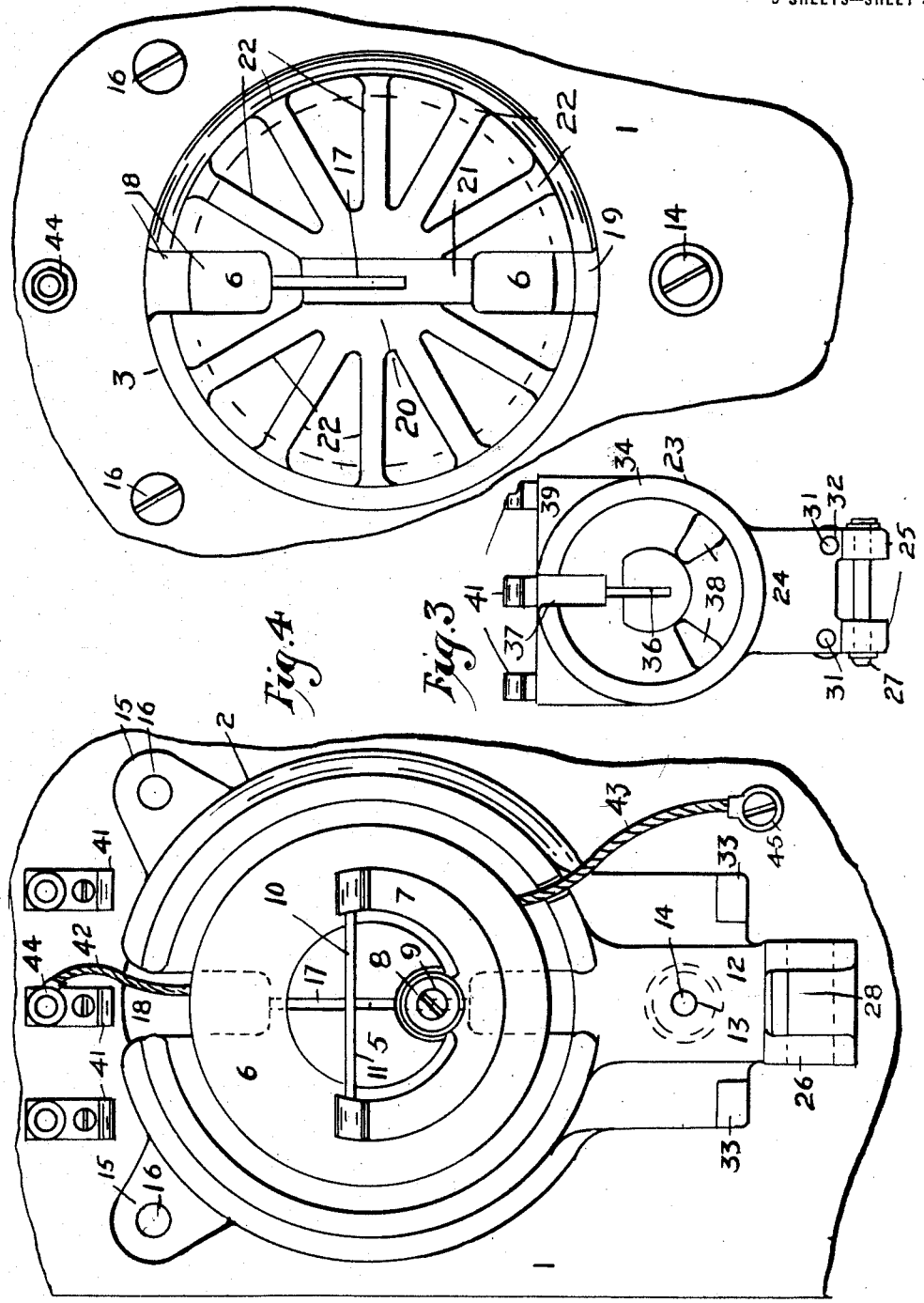
WITNESS
T.F. Dilworth
INVENTOR.
Charles H. Rippl
by F. N. Barber
attorney

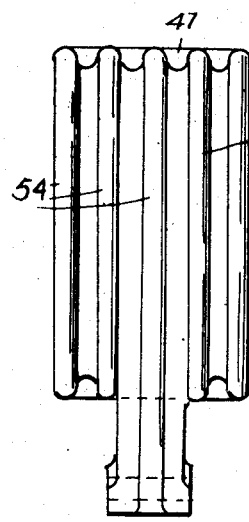
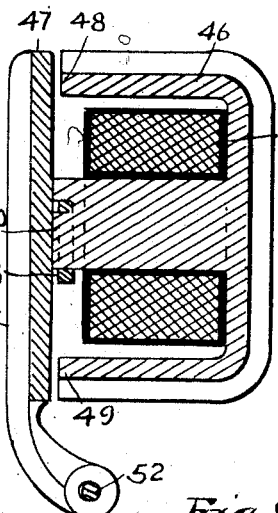
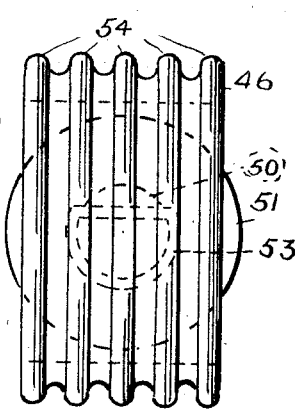
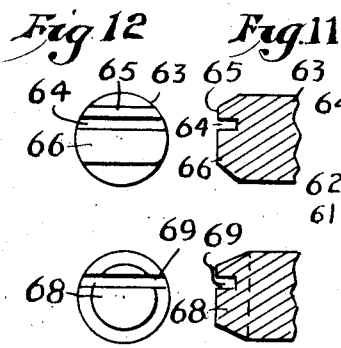
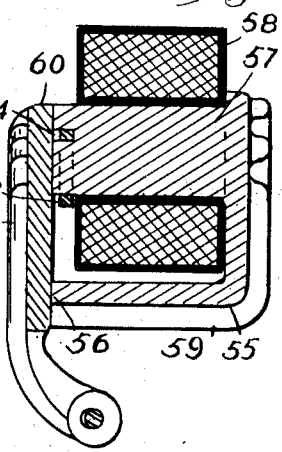
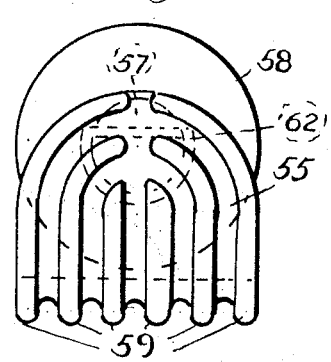

UNITED STATES PATENT OFFICE.

CHARLES H. RIPPL, OF CLEVELAND, OHIO, ASSIGNOR TO THE ELECTRIC CONTROLLER & MANUFACTURING COMPANY, OF CLEVELAND, OHIO, A CORPORATION OF OHIO.

ALTERNATING-CURRENT MAGNET.

1,370,914. Specification of Letters Patent. Patented Mar. 8, 1921.

Application filed June 7, 1919. Serial No. 302,467.

*To all whom it may concern:*

Be it known that I, CHARLES H. RIPPL, a citizen of the United States, residing at Cleveland, in the county of Cuyahoga and State of Ohio, have invented new and useful Improvements in Alternating-Current Magnets, of which the following is a specification.

My invention relates to alternating-current magnets.

Alternating-current magnets have their magnetic circuits composed of laminated material for the purpose of reducing eddy currents. It is one of the purposes of the present invention to provide an alternating-current magnet having a solid, or non-laminated, structure for carrying the flux. While I do not limit my invention to the precise material composing the magnetic circuit, I prefer to employ cast-iron high in graphic carbon and of low hysteresis effects. Carbon in this form in cast-iron increases the resistance to the flow of electric currents, and, therefore, reduces eddy currents. In order still further to decrease eddy currents I provide flux-paths external to the exciting winding with thin ribs coinciding with the direction of the flux. This reduces materially the area of the path in which each eddy current may flow, thereby increasing the resistance of this path, and consequently decreasing the eddy current, without reducing the cross-section for the passage of the flux. In order to hold down hysteresis losses to a reasonable degree, it is advisable to make the cross-section of the cast-iron magnetic circuit large since this keeps the flux-density low, and hysteresis increases rapidly with flux density. Another object of my invention is to provide a material for magnetic circuits, which is cheaper and suffers less distortion due to hammering than steel laminæ. Other objects of this invention appear hereinafter.

Figure 5:
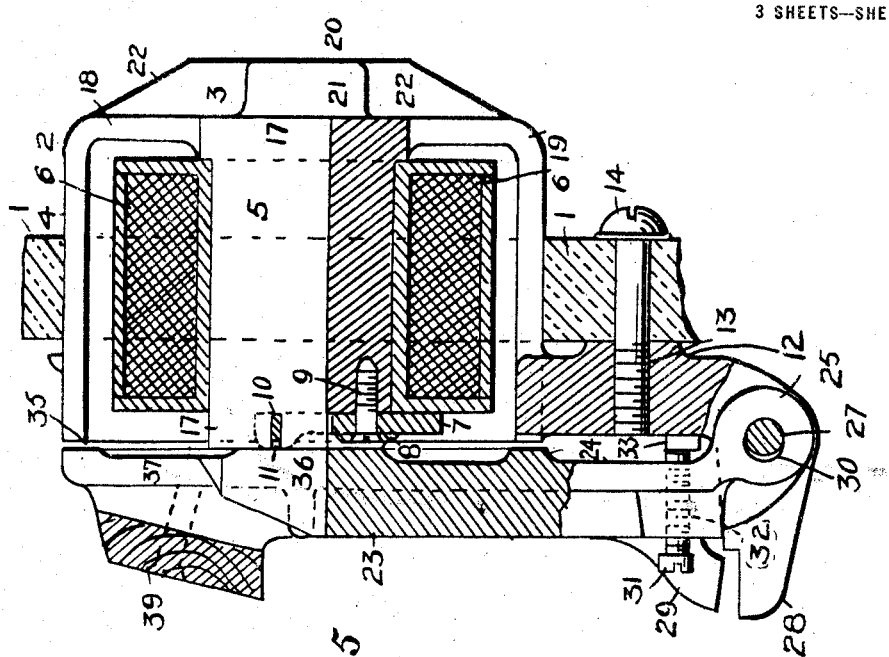
Figure 1:
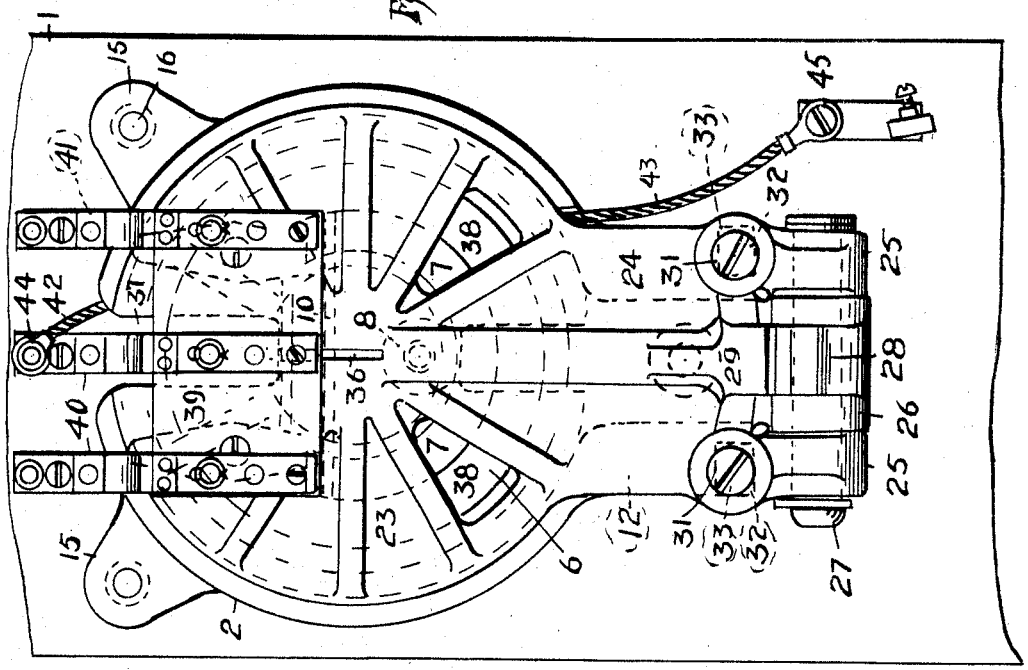

Referring to the accompanying drawings, Figure 1 is a front elevation of my invention; Fig. 2, a front elevation with the armature removed; Fig. 3, a rear elevation of the armature, the scale being reduced one-half; Fig. 4, a rear view of Fig. 2; Fig. 5, a central vertical longitudinal section of the stationary portion of my magnet and of the armature in closed position; Fig. 6, a central vertical section of a second form of my invention; Fig. 7, an elevation of the rear or right-hand end of Fig. 6; Fig. 8, a front elevation of the armature of Fig. 6; Fig. 9, a central vertical section of a third form of my invention; Fig. 10, an elevation of the rear or right-hand end of Fig. 9; Fig. 11, a central longitudinal section of the front portion of a second form of the magnet core; Fig. 12, a front elevation of Fig. 11; Fig. 13, a central longitudinal section of the front portion of a third form of the magnet core; and Fig. 14, a front elevation of Fig. 13.

Referring first to Figs. 1 to 5, 1 designates a support composed of slate or other insulating material, to which my magnet and the parts adjacent thereto are secured. The frame 2 of the magnet has, in general, a cylindrical exterior, 3 being the rear wall and 4 the annular exterior wall preferably integral with the rear wall and extending forwardly therefrom at right angles. Preferably integral with the rear wall 3 is the cylindrical core 5 extending forwardly concentric with the exterior wall 4. An annular space is left between the wall 4 and the core 5 for the exciting winding which may be held in place by the arc-shaped brass shading-coil resistance 7 extending over the outer end of the winding for about 180° and having the radial lug 8 secured to the pole or outer end of the core 5 by the screw 9. The end of the shading-coil resistance 7 has the copper bar 10 which is seated in the slot 11 in the end of the core 5.

The magnet frame 2 has in the lower side the lug 12 having the screw-hole 13 to receive the screw 14 which passes through the support 1 to fasten the frame to the support. The frame has also the two ears 15 to receive the screws 16 which pass through the support 1 into the said ears to aid in holding the magnet securely on the support 1.

The core 5 and the rear wall 3 have the relatively narrow slot 17 extending from the front end of the core entirely through the rear wall and entirely to the periphery of the core at its upper side to prevent the circulation of eddy currents around the core. The slot 17 opens into the wider slot 18, which extends radially from the slot 17 through the rear wall 3 and the side wall 4. The rear wall 3 below the core 5 and the lower side of the wall 4 has the slot 19 which, like the slot 18 and the rear portion of the slot 17, prevents the circulation of eddy current around the walls 3 and 4.

The rear wall 3 of the magnet frame 2 is somewhat thickened at its central portion 20, which has the open slot 21 extending to the rear of the narrower slot 17 and communicating therewith. The upper and lower ends of the slot 21 are open. The slot 21 prevents the circulation of eddy currents around the thickened portion 20 of the frame. The slots also provide ventilation. The lateral portions of the said portion 20 are each provided with several thin radial ribs 22 which gradually taper or otherwise become of less cross-area as they approach the periphery of the rear wall 3 at or near which they may terminate. The thickened rear wall 20 affords a path for the comparatively dense flux flowing from the rear end of the core 5 while the diverging ribs with the rear wall 3 provide in the aggregate at least as large a path for the flux. The ribs extend in the direction of the flux and are made quite thin, preferably as thin as they can be practically cast, so that the eddy currents, which have a very small area for travel, thereby encounter very high resistance and become very greatly reduced. The ribs may be reduced in elevation as described because the area of the rear wall 3 rapidly increases from its center to its periphery, thereby increasing the cross-area of the flux-path. The ribs serve also to radiate heat. The rear wall 3 may be kept comparatively thin when the ribs are used, so that any eddy currents tending to flow therein will meet with increased resistance. The annular wall 4, owing to its large cross-area, may also be made comparatively thin for the same reason.

23 is the armature for the magnet. It has the same general shape as the rear wall of the frame. The central portion thereof opposite the core is, like the central portion of the rear of the frame, thickened to make an adequate path for the comparatively dense flux there. The portion of the armature surrounding the central portion is, like the corresponding portion of the rear wall, made as thin as possible to cut down eddy currents therein. To increase the flux-carrying capacity of the armature, thin radial ribs are provided like those on the rear wall. The ribs permit the armature wall and rear wall to be made somewhat thinner than they would be without the ribs. The ribs also add strength to the thin walls. It has at the lower edge the arm or lug 24 provided at its lower end with the pair of hinge-lugs 25 to receive between them the hinge-lug 26 at the lower end of the lug 12. The hinge-pin 27 extends through alined openings in the lugs 25 and 26. The lug 26 has the forwardly-projecting stop-lug 28 on which the stop-lug 29 on the arm 24 rests when the armature is in its open position, or swung back to its limit away from the magnet frame 2. The pin 27 is slightly smaller than the hole 30 therefor in the lug 25, as shown on Fig. 5, in order to allow the armature slight play for adjustment toward and from the pole faces of the core 5 and the exterior wall 4. This adjustment is effected by the two, preferably brass, spacing screws 31 extending through the tapped holes 32 in the lug 24 and having their inner ends resting on the two faces or lugs 33 projecting forwardly from the lug 12 a short distance above the hinge-pin 27. The spacing screws are adjusted to hold the armature pole-face 34 out of contact with the pole-face 35 of the wall 4.

The armature 23 has the narrow slot 36 registering with the core-slot 17 and the wider slot 37 registering with the slot 18 to prevent the circulation of eddy currents. The armature, like the rear wall 3, is thickened at its central portion opposite the core 5 and has the radiating ribs decreasing in cross-section gradually toward the outer edge of the armature. These ribs are for the same purposes as the ribs 22 and need not be further described. The armature below its center has a number of radial holes 38 to prevent the circulation of eddy currents and for ventilation.

The upper portion of the front face of the armature carries the insulating block 39 of wood or other material, to which the contact fingers 40 are attached so as to engage respectively the stationary contacts 41 secured to the support 1. 42 and 43 are the terminal wires of the winding 6 and are connected to the terminal screws 44 and 45, respectively.

The shading-coil 7 with its copper bar 10 forms a closed path for currents of electricity induced by the alternating fluxes passing through the core 5 and across the bar 10. These induced currents produce secondary fluxes which lag so as to produce magnetic pulls between the core and the armature at the times when the primary fluxes are zero or at their lowest values, whereby the armature is held against its core without chattering or humming. The arc-shaped portion of this shading-coil circuit is made of some material, as brass, of relatively high resistance.

The frame and armature are preferably made of cast-iron preferably containing a relatively large percentage of free or graphitic carbon for the purposes hereinbefore stated.

It is impossible to state the dimensions of the various parts of the armature and frame, which will be best for all conditions of load and current, but I have found that a magnet having the proportions shown on the drawings gives excellent results.

Referring now to Figs. 6 to 8, I show the frame 46 and armature 47 with rectangular instead of circular elevations. The frame is E-shaped having the upper and lower poles 48 and 49 and the core 50 between them. The winding 51 surrounds the core and lies between the poles of the frame. The armature swings on the pivot 52 and is engageable with the core 50 which is provided with the shading-coil 53. The outer faces of the frame and the armature are provided with narrow ribs 54 extending in the direction of the flux through the frame and armature and therefore at right angles to the path of the eddy currents therein.

In Figs. 9 and 10, the frame 55 is L-shaped, having at one end the pole 56 and at the other end the core 57, on which the winding 58 is mounted. Narrow ribs 59 begin opposite the rear end of the core and curve, with the curvature of the rear end of the frame and the natural paths of the flux, toward the angle of the frame 55, soon running in straight parallel lines along the outer face of the frame to the pole 56. The armature 60 has the ribs 61 arranged as on the opposite face of the frame, that is, parallel with the path of the flux. 62 is a shading-coil for the core 57.

On Figs. 11 and 12, I show the outer or free end of a core 63 in the form of a truncated wedge having the slot 64 for a shading-coil. The extreme end of the core which is engaged by an armature is thus divided into narrow rectangular surfaces 65 and 66, which have larger perimeters than square or circular surfaces. These rectangular surfaces are made as narrow as consistent with the required pull to keep the armature closed, or have as large perimeters as possible, in order to reduce the paths for eddy currents at the points where the flux density is greatest.

In Figs. 13 and 14, I show a core 67 having its free end or pole in the form of a frustrum of a cone, 68 representing a slot for a shading-coil. This core like the core 63, concentrates the flux at the contact of the pole with the armature. This permits a larger core to be used for reducing hysteric effects while giving a large pull on the armature.

The thin parts of the magnetic portions of the flux-paths of my magnet are arranged to be cut transversely by planes which include the axial center of the core. The thinness of the armature is measured on lines parallel with the core.

My invention may assume many other forms. I desire, therefore, to cover such modifications thereof as come within the scope of the appended claims.

I claim—

1. In an alternating-current magnet, a winding, a magnetizable core therein, and an external magnetizable circuit member between the ends of the core, a portion of the said member having sufficient thinness to oppose material resistance to eddy currents and being arranged to be cut transversely by planes which include the axial center of the core.

2. In an alternating-current magnet, a winding, a magnetizable core therein, and an external magnetizable circuit member between the ends of the core, a portion of the said member having its mass distributed to secure low flux density and having sufficient thinness to oppose material resistance to eddy currents and being arranged to be cut transversely by planes which include the axial center of the core.

3. In an alternating-current magnet, a magnetic member having sufficient thinness to oppose material resistance to eddy currents, and ribs on the circuit extending in the direction of the flux and made sufficiently thin to oppose material resistance to eddy currents.

4. In an alternating-current magnet, a magnetic member having its mass distributed to secure low flux-density, made sufficiently thin to oppose material resistance to eddy currents, and bearing ribs of magnetic material extending in the direction of the flux and made sufficiently thin to oppose material resistance to eddy currents.

5. In an alternating-current magnet, a magnetic member having ribs of sufficient thinness to oppose material resistance to eddy currents.

6. In an alternating-current magnet, a winding, a magnetic core therein, and an armature extended at right angles to the core and having a portion thereof of sufficient thinness, as measured on lines parallel with the core, to oppose material resistance to eddy currents.

7. In an alternating-current magnet, a winding, a core therein, and an armature composed of cast iron having a portion thereof of sufficient thinness, as measured on lines parallel with the core, to oppose material resistance to eddy currents.

8. An alternating-current magnet, comprising a winding, and a magnetic frame having a core in the winding, the end of the frame opposite the end of the core being thickened and provided with narrow ribs extending from the thickened portion in the direction of the flux.

9. An alternating-current magnet, comprising a winding, and a magnetic frame having a core in the winding, the end of the frame opposite the end of the core being thickened and provided with narrow ribs extending from the thickened portion in the direction of the flux, the ribs decreasing in height from the said thickened portion.

10. An alternating-current magnet, comprising a winding, and a magnetic frame having a core in the winding, the end of the frame opposite the end of the core being thickened and provided with narrow ribs extending from the thickened portion in the direction of the flux, in combination with an armature provided with a thickened portion opposite the free end of the core and with thin ribs extending in the direction of the flux.

11. An alternating-current magnet, having a core with one end transversely slotted, a winding on the core, and a shading-coil secured to the said end of the core and engaging an end of the winding to hold it in place.

Signed at Cleveland, Ohio, this 14th day of May, A. D. 1919.

CHARLES H. RIPPL.